United States Patent
Matsuoka

(10) Patent No.: US 11,635,129 B2
(45) Date of Patent: Apr. 25, 2023

(54) TORQUE CONVERTER AND DRIVE UNIT

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/217,236

(22) Filed: Mar. 30, 2021

(65) Prior Publication Data
US 2021/0332874 A1    Oct. 28, 2021

(30) Foreign Application Priority Data

Apr. 28, 2020  (JP) .............................. JP2020-078968
Jun. 22, 2020  (JP) .............................. JP2020-107207

(51) Int. Cl.
F16H 45/02      (2006.01)
F16H 45/00      (2006.01)
B60K 1/00       (2006.01)

(52) U.S. Cl.
CPC ................ *F16H 45/02* (2013.01); *B60K 1/00* (2013.01); *F16H 2045/002* (2013.01); *F16H 2045/005* (2013.01)

(58) Field of Classification Search
CPC . F16H 45/02–2045/0294; F16H 41/00–41/32; F16H 2045/002
See application file for complete search history.

(56) References Cited

U.S. PATENT DOCUMENTS

| 4,018,106 | A | * | 4/1977 | Uozumi | .................. F16H 3/663 475/47 |
| 5,685,404 | A | * | 11/1997 | Fukushima | ............. F16H 45/02 192/3.26 |
| 5,789,823 | A | * | 8/1998 | Sherman | .................. F16H 61/62 290/46 |
| 6,293,379 | B1 | * | 9/2001 | Gradu | ..................... F16H 61/60 192/3.22 |
| 2010/0273603 | A1 | * | 10/2010 | Roses | ................. B60W 10/026 903/909 |
| 2016/0109011 | A1 | * | 4/2016 | Gibbs | ..................... F16H 45/02 192/3.25 |

FOREIGN PATENT DOCUMENTS

| DE | 10350932 A1 * | 5/2004 | ............. F16D 23/06 |
| DE | 102011088853 A1 * | 6/2013 | ........... F16H 61/143 |
| DE | 102014222717 A1 * | 5/2016 | ............. F16H 41/26 |
| FR | 2928432 A3 * | 9/2009 | ............. F16H 45/02 |
| GB | 2193766 A * | 2/1988 | ............. F16H 45/00 |
| JP | 5370233 B | 12/2013 | |
| WO | WO-0221020 A1 * | 3/2002 | ............. F16H 45/02 |

* cited by examiner

*Primary Examiner* — Ernesto A Suarez
*Assistant Examiner* — Lillian T Nguyen
(74) *Attorney, Agent, or Firm* — United IP Counselors, LLC

(57) ABSTRACT

A torque converter disposed between a prime mover and an output shaft is disclosed. The torque converter includes a cover, an impeller, a turbine, and a first clutch. The impeller is unitarily rotated with the cover. The turbine is disposed opposite to the impeller. The first clutch is configured to allow and block transmitting power outputted from the prime mover to the cover.

5 Claims, 4 Drawing Sheets

TORQUE CONVERTER AND DRIVE UNIT

This application claims priority to Japanese Patent Application Nos. 2020-078968, filed Apr. 28, 2020, and 2020-107207, filed Jun. 22, 2020. The entire contents of these applications are incorporated by reference herein in their entireties.

TECHNICAL FIELD

The present invention relates to a torque converter and a drive unit.

BACKGROUND ART

A torque converter is installed for amplifying a torque outputted from a prime mover. There has been proposed a type of electric car in which a torque converter is installed to amplify a torque outputted from a motor (e.g., Publication of Japan Patent No. 5370233).

As a result of keen study, the inventor of the present invention found the following. When a motor or so forth is used as a prime mover, such a prime mover is rotated at a high rotational speed of, e.g., about 8000 rpm or greater even in normal traveling. Hence, it is concerned that a torque converter is damaged or broken if not having strength enough to withstand the high rotational speed.

BRIEF SUMMARY

In view of the above, it is an object of the present invention to prevent a torque converter from being damaged or broken.

A torque converter according to a first aspect of the present invention is disposed between a prime mover and an output shaft. The torque converter includes a cover, an impeller, a turbine, and a first clutch. The impeller is unitarily rotated with the cover. The turbine is disposed opposite to the impeller. The first clutch is configured to allow and block transmitting power outputted from the prime mover to the cover.

According to this configuration, when the prime mover is rotated at a high speed (of e.g., 8000 rpm or greater), for instance, the first clutch is turned to a clutch-off state; whereby the power outputted from the prime mover is not transmitted to the cover. Because of this, such a situation can be prevented that the torque converter is damaged or broken when the strength thereof is not enough to withstand the rotational speed of the prime mover. It should be noted that when the prime mover is rotated at a low speed, the first clutch can be turned to the clutch-off state.

Preferably, the torque converter further includes a second clutch. The second clutch is configured to allow and block transmitting the power outputted from the prime mover to the output shaft without through the cover.

Preferably, the torque converter further includes a third clutch. The third clutch is configured to be capable of blocking transmitting the power from the output shaft to the turbine.

Preferably, the third clutch is a one-way clutch. The one-way clutch is configured to allow transmitting the power from the turbine to the output shaft and block transmitting the power from the output shaft to the turbine.

Preferably, the first clutch is a wet clutch.

Preferably, the first clutch is a dry clutch.

Preferably, the torque converter further includes a stator. The stator is disposed between the impeller and the turbine. The stator is attached to a stationary shaft in a non-rotatable manner. According to this configuration, a one-way clutch conventionally disposed between the stationary shaft and the stator can be omitted, whereby the torque converter can be reduced in cost, weight, and size.

A drive unit according to a second aspect of the present invention includes a prime mover and the torque converter configured as any of the above. The torque converter is a component that the power outputted from the prime mover is transmitted.

Overall, according to the present invention, the torque converter can be prevented from being damaged or broken.

DETAILED DESCRIPTION

A drive unit according to the present preferred embodiment will be hereinafter explained with reference to drawings. It should be noted that in the following explanation, the term "axial direction" refers to an extending direction of a rotational axis of a torque converter. On the other hand, the term "circumferential direction" refers to a circumferential direction of an imaginary circle about the rotational axis, whereas the term "radial direction" refers to a radial direction of the imaginary circle about the rotational axis.

Drive Unit

Figure 1:
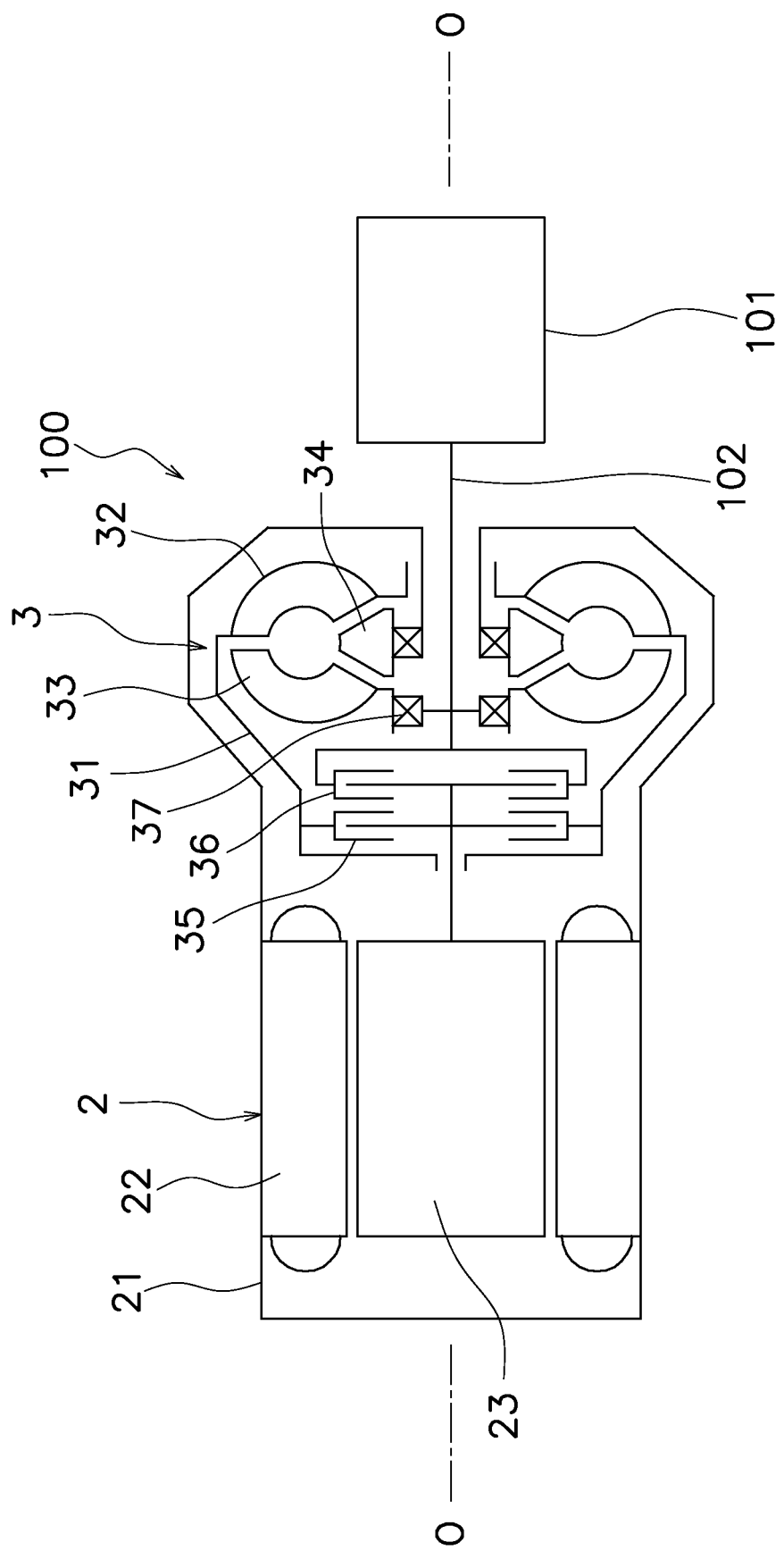
FIG. 1 is a schematic diagram of a drive unit.

As shown in FIG. 1, a drive unit 100 includes a motor 2 (exemplary prime mover) and a torque converter 3. The drive unit 100 outputs power to an output shaft 102. It should be noted that the output shaft 102 is, for instance, an input shaft of a transmission 101. The drive unit 100 is installed in, for instance, an electric car. The drive unit 100 is configured to drive a drive wheel.

Motor

The motor 2 is an electric motor. The motor 2 includes a motor casing 21, a stator 22, and a rotor 23. In the present preferred embodiment, the motor 2 is of a so-called inner rotor type. The motor casing 21 is non-rotatable, while being fixed to a vehicle body frame or so forth.

The stator 22 is fixed to the inner peripheral surface of the motor casing 21. The stator 22 is non-rotatable. The rotor 23 is rotated about a rotational axis O. The rotor 23 is disposed radially inside the stator 22.

Torque Converter

The torque converter 3 is configured to be rotated about the rotational axis O. The rotational axis O of the torque converter 3 is substantially matched with that of the motor 2. In other words, the drive unit 100 is rotated about the rotational axis O.

The torque converter 3 is disposed between the motor 2 and the output shaft 102. The torque converter 3 is configured to amplify a torque inputted thereto from the motor 2 and output the amplified torque to the output shaft 102.

Figure 2:
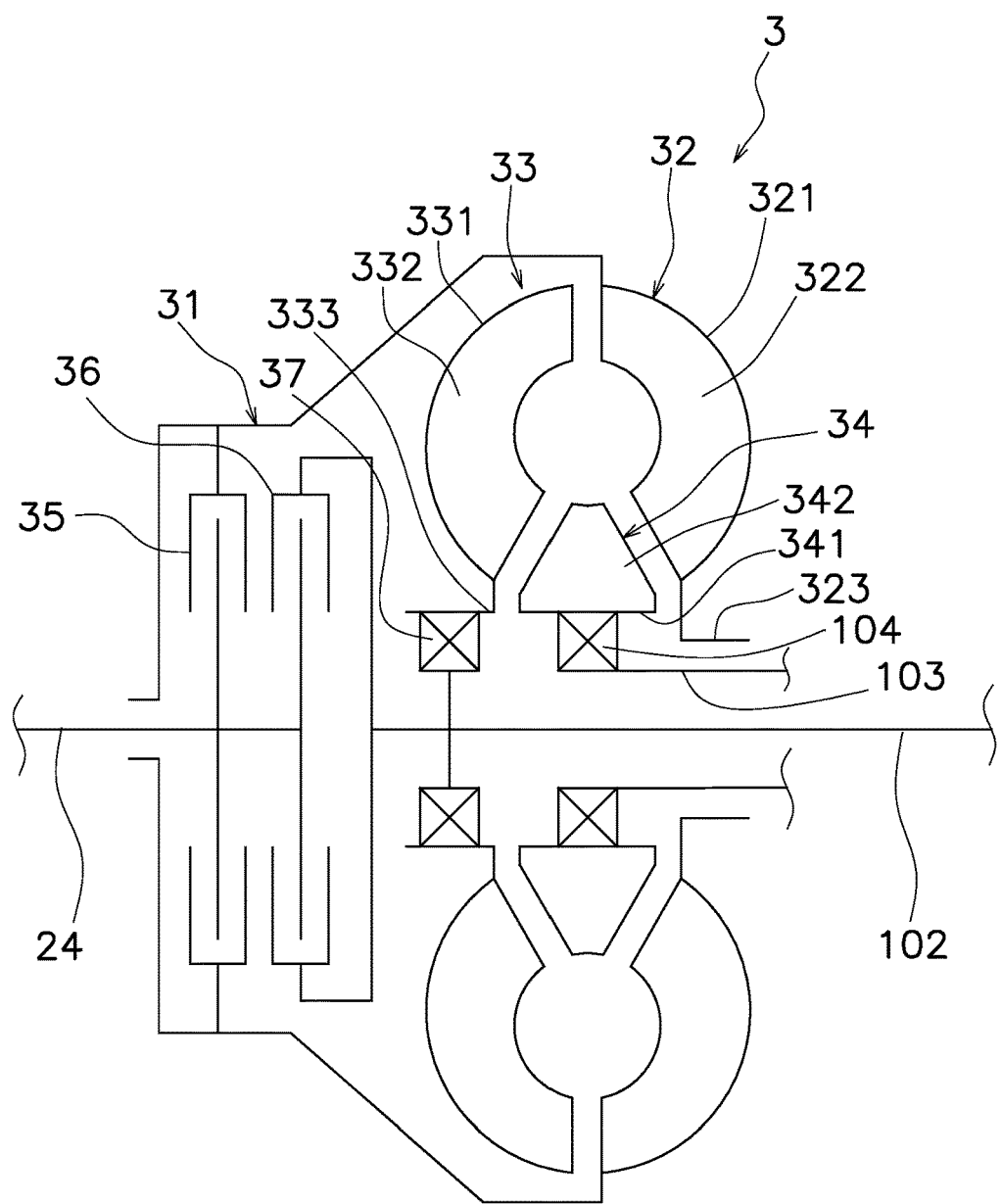
FIG. 2 is a schematic diagram of a torque converter.

As shown in FIG. 2, the torque converter 3 includes a cover 31, an impeller 32, a turbine 33, a stator 34, a first clutch 35, a second clutch 36, and a third clutch 37. Hydraulic oil is supplied to the interior of the torque converter 3.

The cover 31 is disposed in a rotatable manner. The cover 31 is rotatable relative to the motor 2. When described in detail, the cover 31 is rotatable relative to the rotor 23. The cover 31 is configured to cover the turbine 33. Besides, the cover 31 is configured to cover the first and second clutches 35 and 36.

The impeller 32 is rotated unitarily with the cover 31. When described in detail, the impeller 32 is fixed to the cover 31 by welding or so forth. The impeller 32 includes an impeller shell 321, a plurality of impeller blades 322, and an impeller hub 323.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that the impeller hub 323 can be provided together with the impeller shell 321 as a single member, or alternatively, can be provided as a member separated from the impeller shell 321.

The turbine 33 is disposed opposite to the impeller 32. When described in detail, the turbine 33 is axially opposed to the impeller 32. The turbine 33 is a component that power is transmitted from the impeller 32 through hydraulic fluid.

The turbine 33 includes a turbine shell 331, a plurality of turbine blades 332, and a turbine hub 333. The plural turbine blades 332 are fixed to the inner surface of the turbine shell 331.

The turbine hub 333 is fixed to the inner peripheral end of the turbine shell 331. For example, the turbine hub 333 is fixed to the turbine shell 331 by at least one rivet. The turbine hub 333 can be provided as a member separated from the turbine shell 331, or alternatively, can be provided together with the turbine shell 331 as a single member.

The turbine hub 333 is supported by the output shaft 102 through the third clutch 37.

The stator 34 is configured to regulate the flow of the hydraulic oil returning from the turbine 33 to the impeller 32. The stator 34 is rotatable about the rotational axis O. For example, the stator 34 is supported by a stationary shaft 103 through a one-way clutch 104. The stator 34 is disposed axially between the impeller 32 and the turbine 33.

The stator 34 includes a stator carrier 341 having a disc shape and a plurality of stator blades 342 attached to the outer peripheral surface of the stator carrier 341.

First Clutch

The first clutch 35 is configured to allow and block transmitting power outputted from the motor 2 to the cover 31. The first clutch 35 is configured to couple an output shaft 24 of the motor 2 and the cover 31 to each other and decouple the output shaft 24 and the cover 31 from each other.

The first clutch 35 is disposed in a power transmission path between the motor 2 and the cover 31. The power transmission path is a path for transmitting the power outputted from the motor 2 to the cover 31. It should be noted that this is the only one power transmission path provided between the motor 2 and the cover 31.

The first clutch 35 is a wet clutch. The first clutch 35 is disposed in a space enclosed by the cover 31 and the impeller 32. When described in detail, the first clutch 35 is disposed between the cover 31 and the turbine 33.

When turned to a clutch-on state, the first clutch 35 transmits the power outputted from the motor 2 to the cover 31. Contrarily, when turned to a clutch-off state, the first clutch 35 blocks transmitting the power outputted from the motor 2 to the cover 31. The states of the first clutch 35 are controlled by, for instance, the pressure of the hydraulic oil supplied to the interior of the torque converter 3 and the direction that the hydraulic oil is supplied.

Second Clutch

The second clutch 36 is configured to allow and block transmitting the power outputted from the motor 2 to the output shaft 102 without through the cover 31. The second clutch 36 is configured to couple the output shaft 24 of the motor 2 and the output shaft 102 to each other and decouple the output shafts 24 and 102 from each other.

The second clutch 36 is disposed in a power transmission path between the motor 2 and the output shaft 102. It should be noted that the cover 31 is not included in the power transmission path in which the second clutch 36 is disposed. In other words, this is a power transmission path for transmitting the power outputted from the motor 2 to the output shaft 102 without through the cover 31.

The second clutch 36 is a wet clutch. The second clutch 36 is disposed in the space enclosed by the cover 31 and the impeller 32. When described in detail, the second clutch 36 is disposed between the cover 31 and the turbine 33. It should be noted that the second clutch 36 is disposed between the first clutch 35 and the turbine 33.

When turned to a clutch-on state, the second clutch 36 transmits the power outputted from the motor 2 to the output shaft 102. It should be noted that the second clutch 36 transmits the power outputted from the motor 2 to the output shaft 102 without through the cover 31 and impeller 32, the turbine 33, and so forth.

Contrarily, when turned to a clutch-off state, the second clutch 36 blocks transmitting the power outputted from the motor 2 to the output shaft 102. The states of the second clutch 36 are controlled by, for instance, the pressure of the hydraulic oil supplied to the interior of the torque converter 3 and the direction that the hydraulic oil is supplied.

It should be noted that in traveling of a vehicle, the second clutch 36 is turned to the clutch-off state when the first clutch 35 is in the clutch-on state, whereas the second clutch 36 is turned to the clutch-on state when the first clutch 35 is in the clutch-off state.

Third Clutch

The third clutch 37 is disposed between the turbine 33 and the output shaft 102. When described in detail, the third clutch 37 is disposed between the turbine hub 333 and the output shaft 102.

The third clutch 37 is configured to be capable of blocking transmitting power from the output shaft 102 to the turbine 33. When described in detail, the third clutch 37 is a one-way clutch. The third clutch 37 is configured to allow transmitting power from the turbine 33 to the output shaft 102 but block transmitting power from the output shaft 102 to the turbine 33.

Actions of Torque Converter 3

The torque converter 3 configured as described above transmits power as follows.

First, when the rotational speed of the motor 2 is low in starting or so forth, the first clutch 35 is turned to the clutch-on state, whereas the second clutch 36 is turned to the clutch-off state. In this condition, the first clutch 35 transmits the power outputted from the motor 2 to the cover 31. On the other hand, the second clutch 36 does not transmit the power outputted from the motor 2 to the output shaft 102.

The power transmitted to the cover 31 is transmitted to the impeller 32 and is then transmitted to the turbine 33 through the hydraulic oil. Subsequently, the power is transmitted to the output shaft 102 through the third clutch 37. In other words, the power outputted from the motor 2 is transmitted through the power transmission path in the order of to the first clutch 35, the cover 31, the impeller 32, the turbine 33, the third clutch 37, and the output shaft 102.

Next, when the rotational speed of the motor 2 exceeds a predetermined value, the first clutch 35 is turned to the clutch-off state, whereas the second clutch 36 is turned to the clutch-on state. In this condition, the first clutch 35 does not transmit the power outputted from the motor 2 to the cover 31. In other words, the power outputted from the motor 2 is not transmitted to the cover 31. On the other hand, the second clutch 36 transmits the power outputted from the motor 2 to the output shaft 102.

Because of this, the power outputted from the motor 2 is transmitted to the output shaft 102 through the second clutch 36 without being transmitted to the cover 31. In other words, the second clutch 36 transmits the power outputted from the motor 2 to the output shaft 102 without through the cover 31. Therefore, even when the motor 2 is rotated at a high speed, the cover 31, the impeller 32, and the turbine 33 are not rotated together with the motor 2 at the high speed. Because of this, such a situation can be prevented that the torque converter 3 is damaged or broken due to the high-speed rotation of the motor 2.

Modifications

One preferred embodiment of the present invention has been explained above. However, the present invention is not limited to the above, and a variety of changes can be made without departing from the gist of the present invention.

Modification 1

Figure 3:
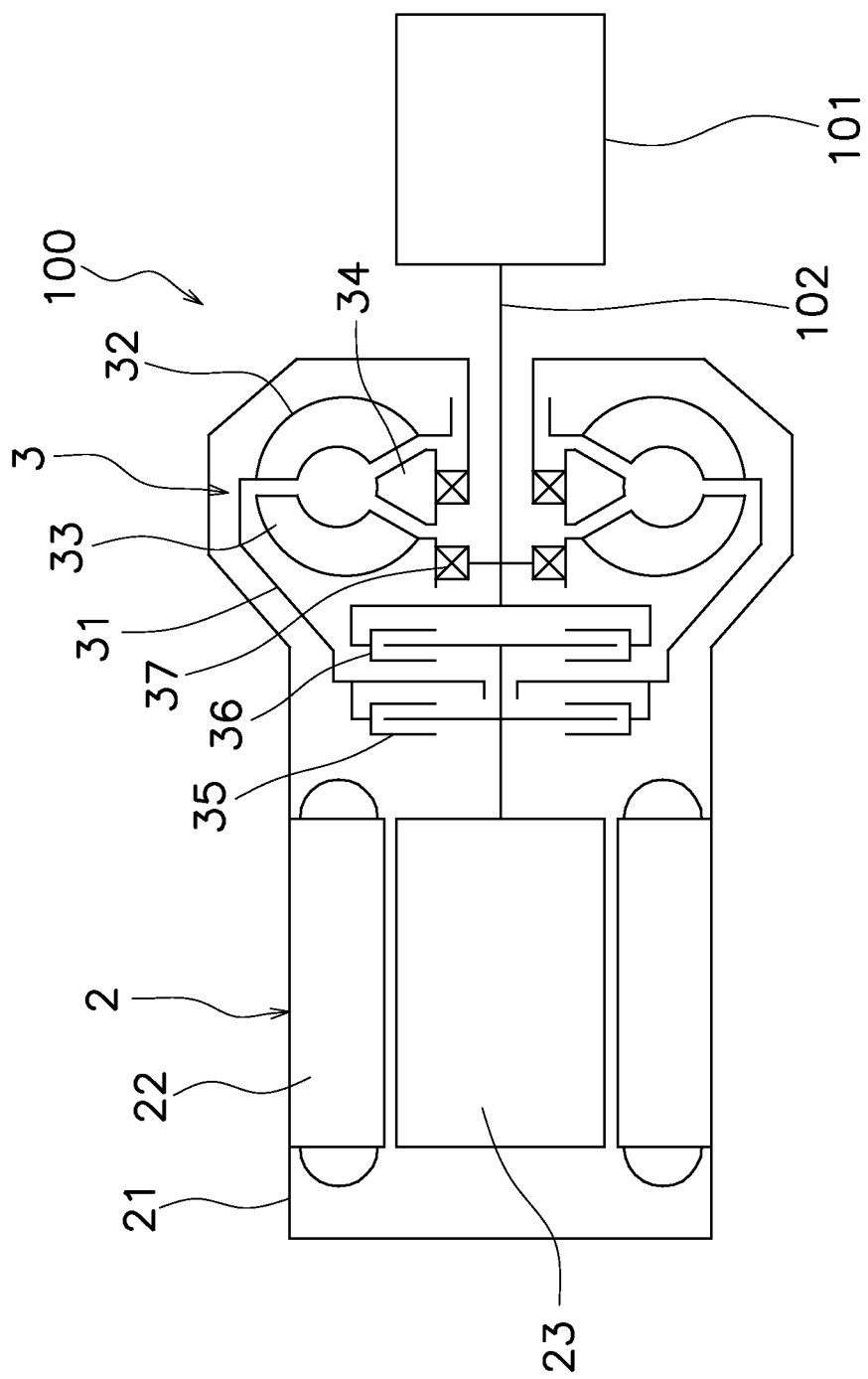
FIG. 3 is a schematic diagram of a drive unit according to a modification.

In the preferred embodiment described above, the first clutch 35 is provided as the wet clutch. However, the first clutch 35 can be provided as a dry clutch. In this case, as shown in FIG. 3, the first clutch 35 can be disposed outside a space enclosed by the cover 31 and the impeller 32.

Modification 2

In the preferred embodiment described above, the third clutch 37 is provided as the one-way clutch. However, the configuration of the third clutch 37 is not limited to this.

Modification 3

In the preferred embodiment described above, the second clutch 36 is directly coupled to the output shaft 102. However, the configuration of the second clutch 36 is not limited to this. For example, the second clutch 36 can be coupled to the output shaft 102 through a reduction gear and/or so forth.

Modification 4

In the preferred embodiment described above, the motor 2 has been explained as an example of the prime mover. However, another type of prime mover such as an engine can be used instead.

Modification 5

Figure 4:
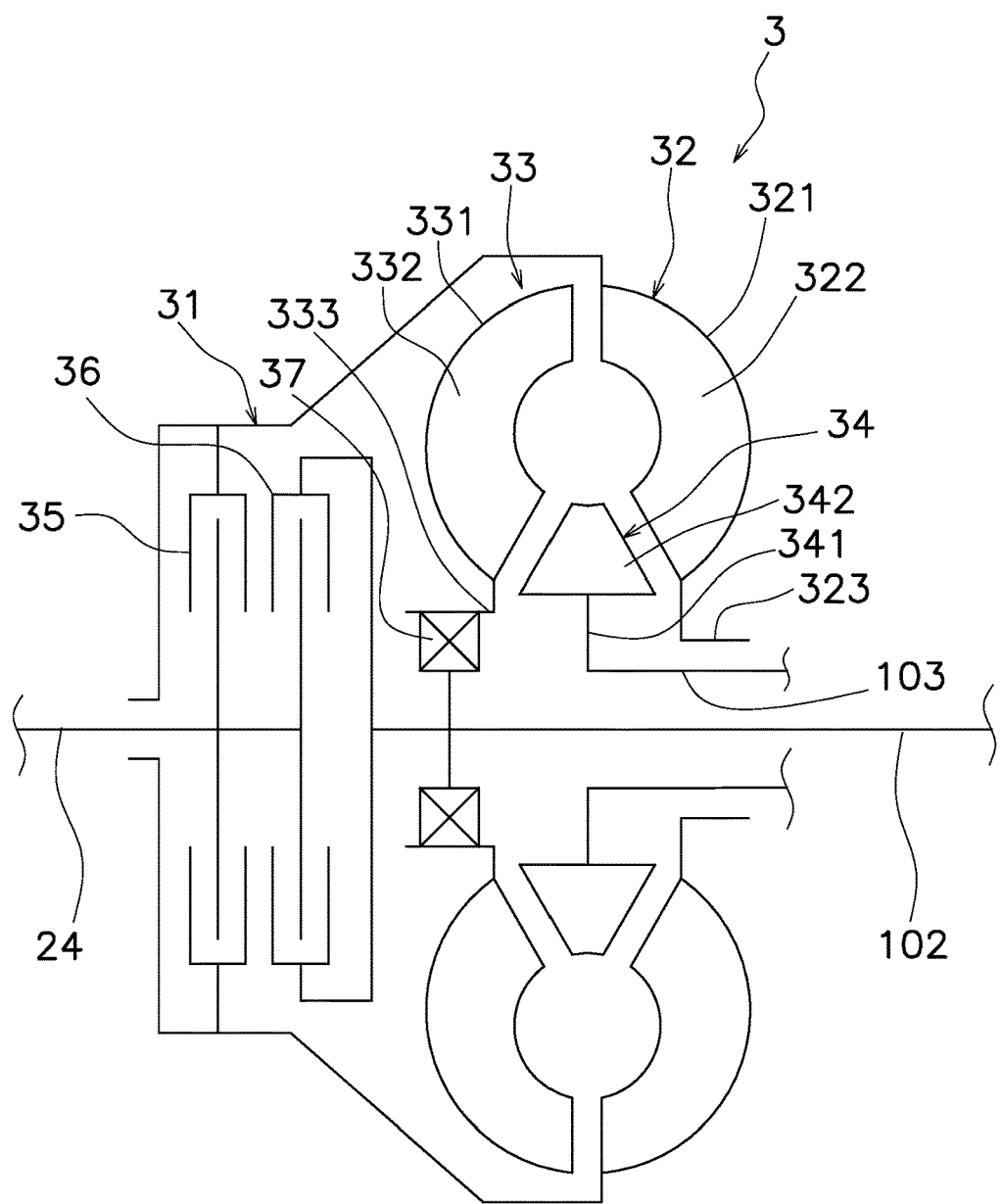
FIG. 4 is a schematic diagram of a torque converter according to another modification.

In the preferred embodiment described above, the stator 34 is attached to the stationary shaft 103 through the one-way clutch 104. However, the method of attaching the stator 34 is not limited to this. For example, as shown in FIG. 4, the stator 34 can be attached to the stationary shaft 103 in a non-rotatable manner. When described in detail, the stator 34 is attached to the stationary shaft 103 without through any one-way clutch. Because of this, the stator 34 is not rotated about the rotational axis O in both forward and reverse directions. For example, the stator carrier 341 includes a spline hole and the stationary shaft 103 is spline-coupled to the stator carrier 341.

According to modification 5, advantageous effects can be obtained as follows. First, in a well-known torque converter, a stator is attached to a stationary shaft through a one-way clutch. With this configuration, when the torque converter is in a coupling range, the stator is enabled to rotate together with an impeller so as not to hinder rotation of the impeller. By contrast, in the torque converter 3 according to the preferred embodiment described above and modification 5, when the torque converter 3 is in a coupling range, the first clutch 35 is turned to the clutch-off state, whereby rotation of the impeller 32 can be stopped. Therefore, even when the stator 34 is attached to the stationary shaft 103 in a non-rotatable manner, this does not result in a drawback that the stator 34 hinders rotation of the impeller 32. Consequently, the one-way clutch can be omitted, whereby the torque converter can be made low-cost, lightweight, and compact.

REFERENCE SIGNS LIST

2 Motor
3 Torque converter
31 Cover
32 Impeller
33 Turbine
34 Stator
35 First clutch
36 Second clutch
37 Third clutch
100 Drive unit
102 Output shaft

What is claimed is:

1. A torque converter disposed between an electric motor and an input shaft of a power transmission device, the torque converter comprising:
a cover;
an impeller unitarily rotated with the cover;
a turbine disposed opposite to the impeller;
a first clutch configured to allow and block transmitting power outputted from the electric motor to the cover;
a second clutch directly coupled to the input shaft to allow and block transmitting the power outputted from the electric motor directly to the input shaft without the power flowing through either of the cover or the turbine; and
a third clutch, the third clutch being a one-way clutch configured to allow transmitting the power from the turbine to the input shaft and to block transmitting the power from the input shaft to the turbine;

wherein when a rotational speed of the electric motor exceeds a predetermined value, the first clutch is switched from allowing transmitting the power to blocking transmitting the power, and the second clutch is switched from blocking transmitting the power to allowing transmitting the power.

2. The torque converter according to claim 1, wherein the first clutch is a wet clutch.

3. The torque converter according to claim 1, wherein the first clutch is a dry clutch.

4. The torque converter according to claim 1, further comprising:

a stator disposed between the impeller and the turbine, wherein the stator is attached to a stationary shaft in a non-rotatable manner.

5. A drive unit comprising:

the electric motor; and the torque converter according to claim 1, the torque converter receiving the power outputted from the electric motor.

\* \* \* \* \*